(12) United States Patent
Mitrik et al.

(10) Patent No.: US 11,464,358 B1
(45) Date of Patent: Oct. 11, 2022

(54) COOKING PAN

(71) Applicant: HPC BRANDS, LLC, Middleton, WI (US)

(72) Inventors: James Mitrik, Fairfield, NJ (US); Paul McGrath, Fairfield, NJ (US); Daniel Curley, Fairfield, NJ (US); Mou-Fu Tsai, New Taipei (TW)

(73) Assignee: HPC Brands, LLC, Middleton, WI (US)

( * ) Notice: Subject to any disclaimer, the term of this patent is extended or adjusted under 35 U.S.C. 154(b) by 0 days.

(21) Appl. No.: 17/382,002

(22) Filed: Jul. 21, 2021

(51) Int. Cl.
| | |
|---|---|
| *A47J 36/02* | (2006.01) |
| *A47J 45/06* | (2006.01) |
| *A47J 36/06* | (2006.01) |
| *A47J 27/00* | (2006.01) |
| *B32B 15/20* | (2006.01) |
| *B32B 15/18* | (2006.01) |
| *B32B 15/04* | (2006.01) |
| *C25D 11/18* | (2006.01) |
| *C25D 11/16* | (2006.01) |
| *A47J 37/10* | (2006.01) |

(52) U.S. Cl.
CPC ........... *A47J 36/025* (2013.01); *A47J 27/002* (2013.01); *A47J 36/06* (2013.01); *A47J 37/10* (2013.01); *A47J 45/061* (2013.01); *B32B 15/043* (2013.01); *B32B 15/18* (2013.01); *B32B 15/20* (2013.01); *C25D 11/16* (2013.01); *C25D 11/18* (2013.01); *B32B 2255/06* (2013.01); *B32B 2255/26* (2013.01); *B32B 2264/107* (2013.01); *B32B 2264/1023* (2020.08); *B32B 2307/536* (2013.01); *B32B 2307/746* (2013.01)

(58) Field of Classification Search
CPC ....... B32B 15/043; B32B 15/04; B32B 15/18; B32B 15/20; A47J 36/025; A47J 36/02; A47J 36/06; A47J 37/10; A47J 37/101; A47J 27/002; A47J 45/061; C25D 11/16; C25D 11/18
USPC ...... 220/573.2, 573.1, 573.3, 753, 752, 912, 220/62.17, 62.15, 62.13, 626
See application file for complete search history.

(56) References Cited

U.S. PATENT DOCUMENTS

| | | | | |
|---|---|---|---|---|
| 2,034,057 | A | * | 3/1936 | Reuss ...................... C25D 7/00 220/573.1 |
| 2,057,254 | A | * | 10/1936 | Sommer ................. A47J 36/02 220/573.1 |
| 2,071,817 | A | * | 2/1937 | Dean ........................ C23D 5/08 427/235 |

(Continued)

FOREIGN PATENT DOCUMENTS

| | | | | |
|---|---|---|---|---|
| EP | 0424072 | A1 * | 4/1991 | ............. C25D 11/18 |
| GB | 191403932 | A * | 12/1914 | ............. A47J 37/101 |

(Continued)

*Primary Examiner* — Robert J Hicks
(74) *Attorney, Agent, or Firm* — Kagan Binder, PLLC

(57) ABSTRACT

The present technology provides a hard-anodized pan that has a steel induction plate and a hybrid coating composition of round ceramic particles. The pan is formed of aluminum with an induction plate affixed. The aluminum is formed into the desired pan shape. The aluminum is sandblasted with beads of a particular size. The sandblasted pan is hard-anodized. The pan is coated with a hybrid coating of round ceramic particles to provide scratch-resistance and a non-stick quality. The pan is coated with a non-stick topcoat.

17 Claims, 11 Drawing Sheets

(56) References Cited

U.S. PATENT DOCUMENTS

| | | | | |
|---|---|---|---|---|
| 2,358,104 A * | 9/1944 | Scavullo | A47J 36/02 | 220/573.1 |
| 2,841,137 A * | 7/1958 | Chace | A47J 36/02 | 126/390.1 |
| 3,211,325 A * | 10/1965 | Wisnicki | C23C 4/18 | 220/573.2 |
| 3,419,414 A * | 12/1968 | Marks | C23C 24/00 | 428/601 |
| 3,473,952 A * | 10/1969 | McFadden | C08L 2666/54 | 428/164 |
| 4,250,215 A * | 2/1981 | Mayer | A47J 36/02 | 206/524.3 |
| 6,802,432 B1 * | 10/2004 | Tien | A47J 36/02 | 220/573.1 |
| 8,499,963 B2 * | 8/2013 | Muller | C03C 3/062 | 220/573.2 |
| 2004/0058188 A1 * | 3/2004 | Groll | A47J 36/02 | 428/651 |
| 2007/0231563 A1 * | 10/2007 | Adams | A47J 36/025 | 428/323 |
| 2008/0105689 A1 * | 5/2008 | Ren | A47J 27/002 | 220/573.2 |
| 2008/0237241 A1 * | 10/2008 | Buffard | A47J 36/025 | 220/573.2 |
| 2017/0369364 A1 * | 12/2017 | Nagamedianova | C03C 17/007 | |
| 2018/0016461 A1 * | 1/2018 | Hidaka | C09D 127/12 | |
| 2019/0030771 A1 * | 1/2019 | Ding | B32B 27/20 | |

FOREIGN PATENT DOCUMENTS

| | | | | |
|---|---|---|---|---|
| GB | 202473 A * | 8/1923 | | A47J 37/101 |
| GB | 1522383 A * | 8/1978 | | A47J 36/02 |
| WO | WO-2013132185 A1 * | 9/2013 | | A47J 36/02 |

\* cited by examiner

COOKING PAN

FIELD OF INVENTION

The present invention relates to cooking devices. In even greater particularity, the present invention relates to a hard-anodized aluminum pan that has a steel induction plate and a hybrid coating composition of round ceramic particles.

BACKGROUND

Conventional pans typically are made of aluminum or another similar metal. Pan manufacturers or designers use different techniques to make the pan easier to use for cooking or cleaning. For example, certain types of pans include anodized aluminum to harden the pan. The harder surface of the pan makes the pan harder to scratch and easier to clean. Other manufacturers or designers elect to use a non-stick coating to allow a user to remove cooked food from the pan. More recently, manufacturers or designers have used induction plates for cooking pans designed to use on an induction cooktop.

These manufacturers or designers have not combined these features into a single pan that enjoys all of the benefits described as well as a hybrid coating composition of round ceramic particles. By looking to maximize particular benefits, such as a pan that has the highest non-stick quality, pans are designed that enjoy the benefits of one of these features. A manufacturer or designer has not been motivated to produce a single pan that includes all of these features. The benefits of creating a pan with a high hardness quality from an anodizing process, with an induction plate for use with induction cooktops, and with a scratch-resistance and a non-stick quality from a hybrid coating composition of round ceramic particles has not been considered or attempted. A conventional pan that is targeted to only a single one of these goals would not enjoy each of the benefits described.

SUMMARY OF THE INVENTION

The present technology provides a hard-anodized pan that has a steel induction plate and a hybrid coating composition of round ceramic particles. The pan is formed of aluminum with an induction plate affixed. The aluminum is formed into the desired pan shape. The aluminum is sandblasted with beads of a particular size. The sandblasted pan is hard-anodized. The pan is coated with a hybrid coating of round ceramic particles to provide scratch-resistance and a non-stick quality. The pan is coated with a non-stick topcoat.

The pan may be shaped into any suitable cooking shape, such as a sauce pan, a pot, a chicken fryer, or any other suitable shape. The pan may include a hollow handle that is riveted to the body of the pan to provide a cooling effect to the handle. The pan may include a flat, glass lid to provide a cover for items cooking in the pan. The flat lid allows the pans to be more securely and efficiently stacked.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

The drawings are appended hereto and form a portion of this disclosure.

DETAILED DESCRIPTION

The example embodiments described herein provide a hard-anodized pan that has a steel induction plate and a hybrid coating composition of round ceramic particles. Unlike conventional pans in the industry, these three elements, along with other design improvements, provide a pan that is gives users a combination of previously unavailable features. The examples describe a method to form the pan and descriptions of the characteristics of the pan.

Figure 1:
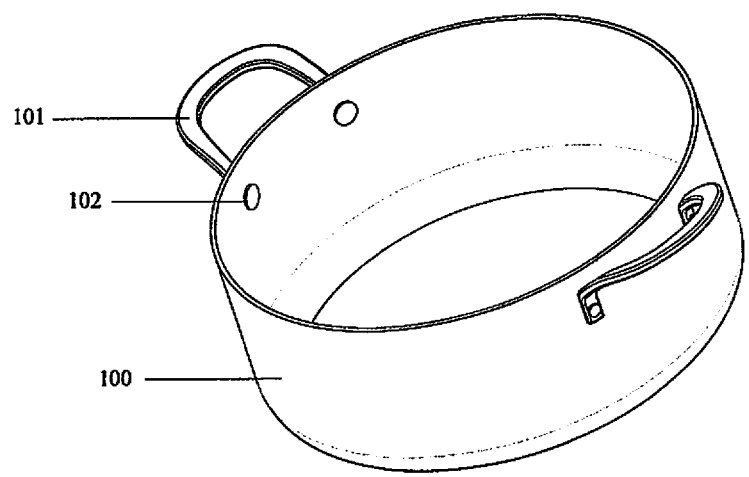
FIG. 1 is a perspective view of one embodiment of a pan and a flat lid.

FIG. 1 a perspective view of one embodiment of a pan 100. The pan 100 is a hard-anodized pan that has a steel induction plate and a hybrid coating composition of round ceramic particles. In the example illustration of FIG. 1, the pan 100 is a round and deep in the style commonly referred to as a "sauce pan." Alternatively, the pan 100 may be shaped into any suitable cooking shape, such as a frying pan, a pot, a griddle, or any other suitable shape. The details of the construction of the pan 100 are discussed in greater detail with respect to FIGS. 4-6.

Figure 7:
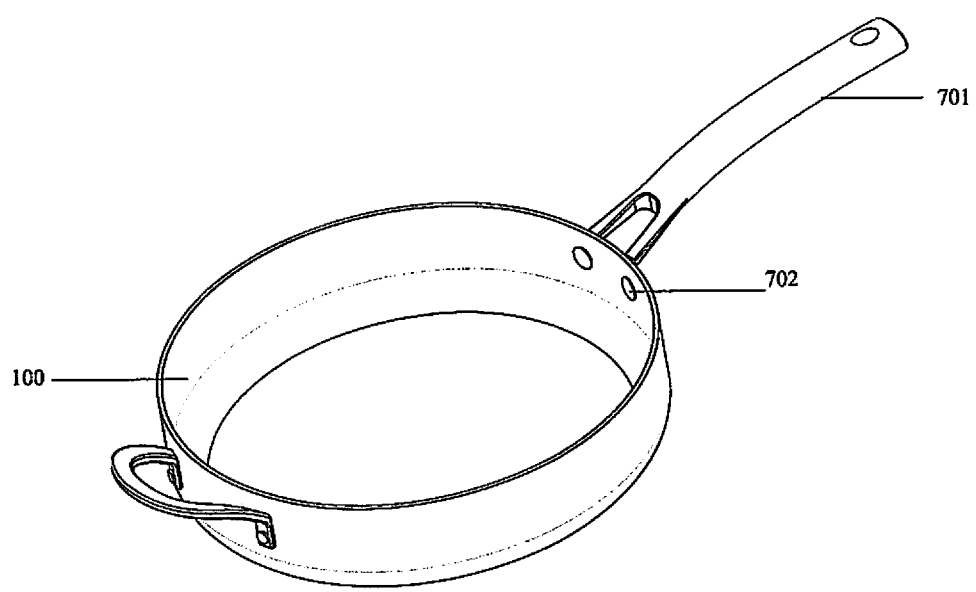
FIG. 7 is a perspective view of one embodiment of a pan and a flat lid.

The pan 100 is illustrated with a handle 101. The handle is affixed to the pan 101 by a rivet 102 or other connection mechanism, such as a screw, a bolt, a weld, or any other suitable connection. In certain examples, the handle 101 is an extended handle as illustrated in FIG. 7. In certain examples, the handle 101 is constructed of a material that transfers heat at a lower rate such that the handle remains cooler than the attached pan 100. The handle 101 may be constructed with a hollow center to slow the heat transfer from the pan 100. The connection mechanism may be configured to slow the heat transfer from the pan 100, such as by using smaller rivets 102. The amount of surface area of the handle 101 touching the pan 100 may be minimized to slow the heat transfer from the pan 100. The handle 101 may be open at one or more ends of the handle 101 to allow air flow to further cool the handle 101. Any or all of these construction designs may be employed to allow the handle 101 to remain cooler than the pan 100. The cooler handle 101 allows a user to lift the pan 100 even when the pan 100 is hot. The cooler handle 101 also allows a user to touch the handle 101 with a lower risk of being burned.

Figure 2:
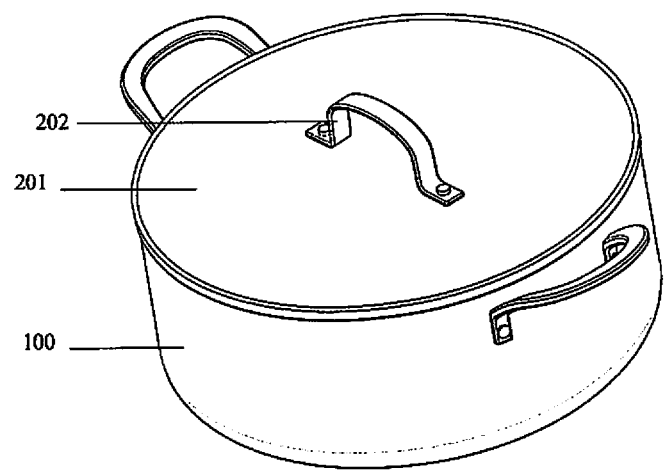
FIG. 2 is a perspective view of one embodiment of a pan and a flat lid.

FIG. 2 is a perspective view of one embodiment of a pan 100 and a flat lid 201. The flat lid 201 may be constructed of any suitable material, such as glass, ceramic, metal, plastic, or any other suitable material. The flat lid 201 may be constructed with a substantially flat surface instead of a convex or concave structure to allow for more efficient cleaning or stacking. The details of the stacking characteristics are discussed in greater detail with respect to FIGS. 10 and 11. The flat lid 201 may have a seal, rim, or other hard or soft edge that seats into or over the edge of the body of the pan 100. The flat lid 201 this seals the interior of the pan 100 from the outside environment to retain heat, vapors, odors, or any other material that is being expelled by the pan 100.

The flat lid 201 is illustrated with a handle 202. In certain examples, the handle 201 is constructed of a material that transfers heat at a lower rate such that the handle remains cooler than the attached flat lid 201. The handle 202 may be constructed with a hollow center to slow the heat transfer from the flat lid 201. The connection mechanism may be configured to slow the heat transfer from the flat lid 201, such as by using smaller rivets 102. The amount of surface area of the handle 202 touching the flat lid 201 may be minimized to slow the heat transfer from the flat lid 201. Any or all of these construction designs may be employed to allow the handle 201 to remain cooler than the flat lid 201. The cooler handle 202 allows a user to lift the flat lid 201 even when the flat lid 201 is hot. The cooler handle 202 also allows a user to touch the handle 202 with a lower risk of being burned.

Figure 3:
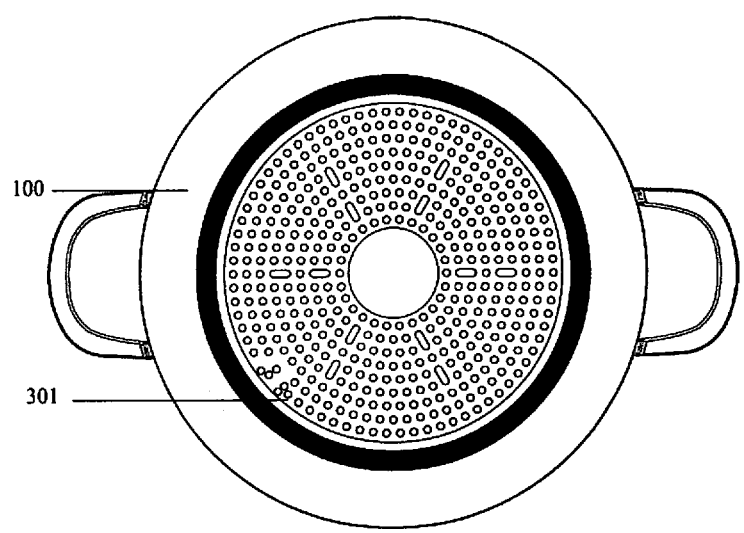
FIG. 3 is a top view of a pan with a steel induction plate.

FIG. 3 is a top view of a pan 100 with a steel induction plate 301. The induction plate 301 may be constructed of stainless steel or any other suitable ferrous material. Induction cooktops require a cooking vessel with a ferrous metal construction to concentrate the cooktop's oscillating magnetic field and produce heat in the metal of the pan 100. The stainless steel induction plate 301 interacts with the induction cooktop to product heat and distribute the heat across the aluminum components of the pan 100.

Further, the stainless steel induction plate 301 further allows heat from a cooktop to be evenly distributed across the pan 100. The induction plate 301 is illustrated with channels, grooves, indentions, or other structural components that facilitate even heating. For example, certain portions of the induction plate are hollow, while other portions are solid. The construction of the induction plate 301 allows heat to flow evenly around the body of the induction plate 301 without cool or hot spots. Certain metals will cause hot spots in one area of the pan 101 and cooler spots in other areas of the pan 101. The stainless steel induction plate 301 provides a more even heating surface with evenly distributed heat across the surface of the induction plate 301. Because the induction plate 301 has a lower heat transfer coefficient than the aluminum components of the pan 100, the pan 100 will temper temperature variations as hot or cold items are placed into the pan 100 compared to an aluminum pan. The slower temperature flow causes the temperature of the induction plate 301 takes longer to change from outside influences, which smooths the temperature variations of the pan 100.

As illustrated, the induction plate 301 is formed into an aluminum body of the pan 100. The induction plate 301 may be affixed or bonded to the pan 100 in any suitable manner, such as by forging, or stamping. The induction plate 301 may be affixed to the bottom of the aluminum of the pan 100 or formed within one or more layers of aluminum or other layers as described herein.

Figure 4:
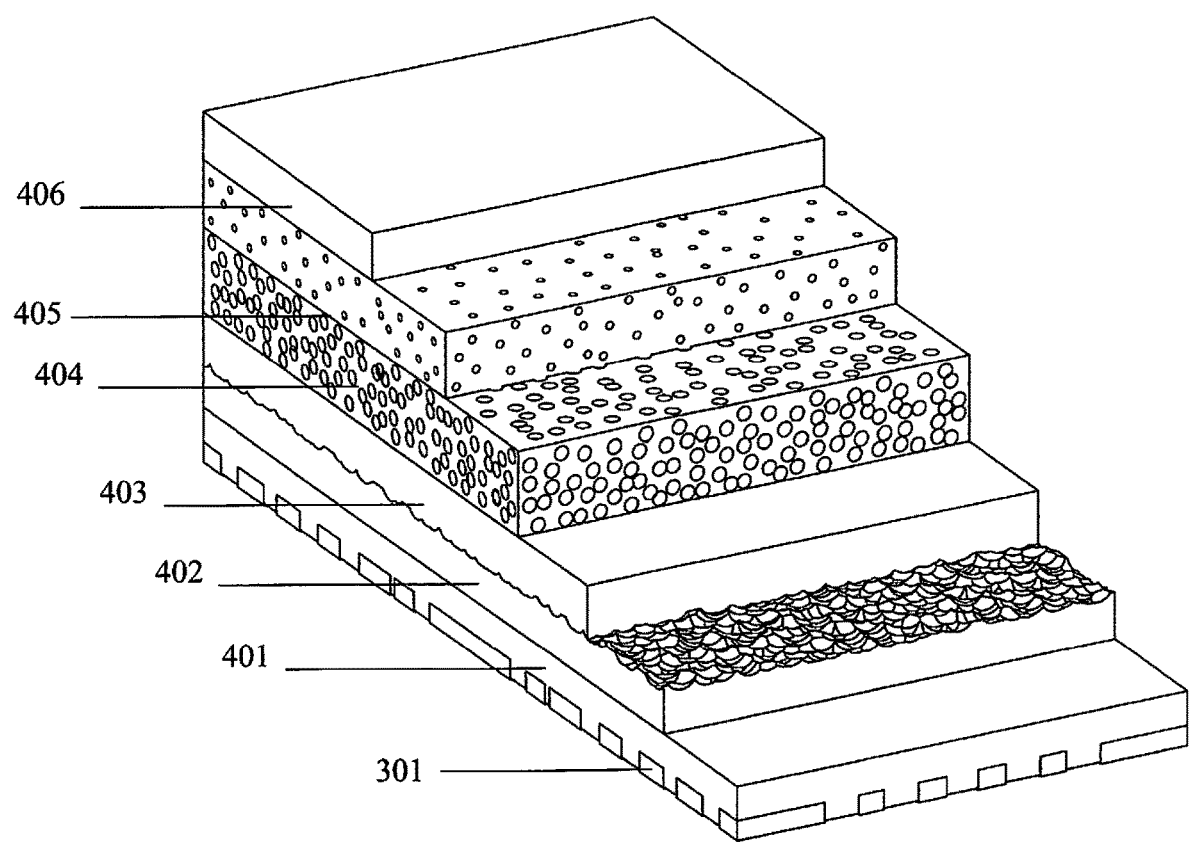
FIG. 4 is a cutaway perspective view of layers of a bottom of the pan.

FIG. 4 is a cutaway perspective view of layers of a bottom of the pan 100. The bottom of the pan 100 is constructed with multiple layers to achieve the benefits of induction heating, scratch resistance, non-sticking qualities, and other benefits. Conventional pans have not combined the elements in the layers of construction as described herein and thus do not receive the benefits described. The layers illustrated in FIG. 4 represent the formation of the bottom of the pan 101 and are not necessarily to scale in size or shape.

The induction plate 301 is illustrated as being affixed to an aluminum layer 401. As described herein, the induction plate 301 may be affixed or bonded to the aluminum layer 401 of the pan 100 in any suitable manner, such as by forging, stamping, casting, or any other suitable process.

The sandblasted layer 402 is a sandblasted surface on the aluminum layer 401. The surface may be sandblasted, scored, otherwise distressed to increase the surface area of the aluminum surface and provide a roughened surface to increase the bond between the aluminum layer 401 and the hard-anodized coating layer 403. In the example, the surface is sandblasted by spherical or round beads. The spherical beads may be sized to provide a specific contour in the roughened surface. In an alternate example, the surface of the sandblasted layer 402 is roughened by chemical etching with acid or an alkali. The roughened sandblasted layer 402 allows for a more consistent and secure bond between the sandblasted layer 402 and the hard-anodized aluminum layer 403.

The hard-anodized aluminum layer 403 is applied over the sandblasted layer 402. The hard-anodized aluminum layer 403 may be bonded or otherwise affixed to the sandblasted layer 402. Hard-anodizing is also referred to as hard coat anodizing. Hard-anodizing aluminum causes a hard, abrasion resistant, porous oxide on the surface of the aluminum. Hard-anodized aluminum creates a surface that will resist scratches or grooves in the aluminum layer 401 caused by cooktop surfaces, cooking utensils, cleaning products, or any other material that rubs or grates against the aluminum layer 401. The hard-anodized aluminum layer 401 affixes more securely and consistently onto the sandblasted layer 402 due to the consistently roughened surface of the sandblasted layer 402.

The hybrid coatings 404 and 405 is applied to the surface of the hard-anodized aluminum layer 401. The hybrid coating 404 is composed of a fluororesin infused with inorganic particles that are substantially round. The inorganic particles have a Mohs hardness of 10 to provide the desired abrasion resistance to the pan 100. The inorganic particles have an average circularity of 0.90 to 1.00 when viewed from an arbitrary angle and compose 1 to 40% by mass of the coating. The inorganic particles are one or more of alumina particles or silicon carbide particles. The fluororesin is preferably composed of at least 20% polytetrafluoroethylene ("PTFE") by mass or more relative to the total amount of the PTFE and any other fluororesins.

The hybrid coating 404 applied to the hard-anodized aluminum layer 401 creates a surface that is substantially harder and more abrasion-resistant than the surface of conventional pans. In an example, the first hybrid layer 404 is a basecoat that bonds with the porous hard-anodized aluminum layer 401. The second hybrid layer 405 is an additional layer of the hybrid coating material that increases the hardness and more abrasion resistance of the pan 101. In certain embodiments, the mass of inorganic particles and/or PTFE in the hybrid coatings 404 and 405 may be varied to achieve different results in the pan surface. For example, a higher mass of inorganic particles may cause the surface to have a greater abrasion-resistance and a higher mass of PTFE may cause the surface to have a higher non-stick quality.

The topcoat layer 406 is a nonstick coating that is applied over the second hybrid layer 405. The nonstick coating of the topcoat layer 406 may be composed of any type of fluoronatic plastic, such as PTFE, or a silicon dioxide coating. The topcoat layer 406 is bonded to the second hybrid layer 405. In an alternate example, the topcoat layer 406 is infused with silver ions to reduce microbial contamination to food. The silver ions inhibit bacterial enzymes and prevent the introduction of the bacteria into food cooked in the pan 100.

Figure 5:
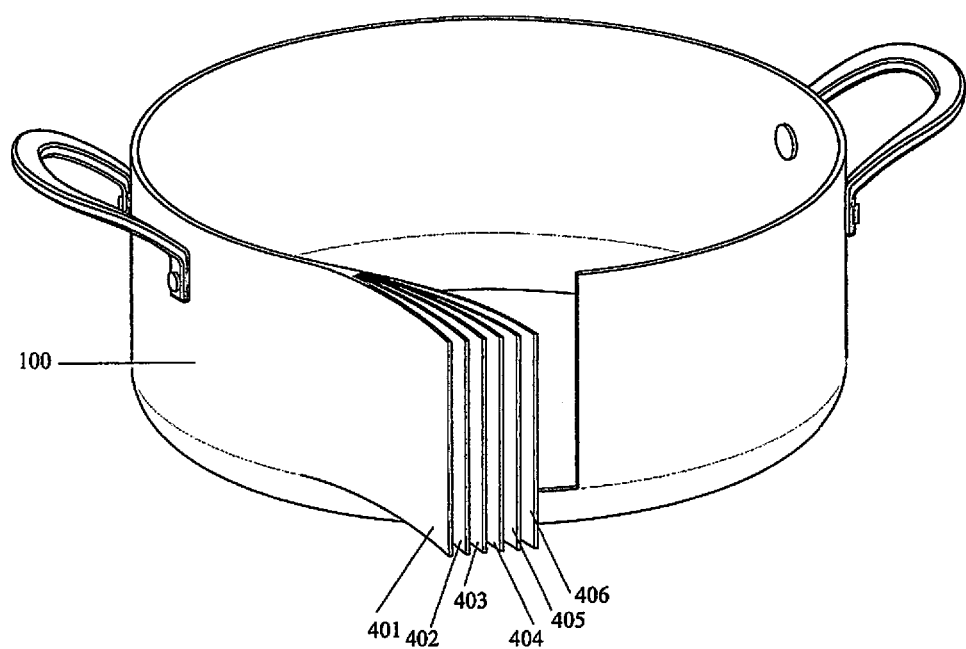
FIG. 5 is a cutaway perspective view of layers of a body of the pan.

FIG. 5 is a cutaway perspective view of layers of a body of the pan. The layers of the body of the pan 100 may include each of the layers of the bottom of the pan 100 as described with respect to FIG. 4. In the illustrated example, the body of the pan 100 does not have the induction plate 301 as a layer. For example, the induction plate 301 may be a component of the bottom of the pan 100, but not in the sidewalls or other body components of the pan 100. The body of the pan 100 is not heated via the induction plate 301. In alternate examples, the induction plate 301 is a layer of the body of the pan 100 in addition to the bottom of the pan 100. As illustrated the outside perimeter of the body of the pan 100 is composed of the aluminum layer 401, as described in FIG. 4. The next layer in from the outside is the sandblasted layer 402, then the hard-anodized coating layer 403, and the hybrid coatings 404 and 405, as described in FIG. 4. The interior of the body of the pan 100 is composed of the topcoat layer 406, as described in FIG. 4. The interior perimeter of the pan 100 thus has similar attributes and characteristics as the inside portion of the bottom of the pan 100.

Figure 6:
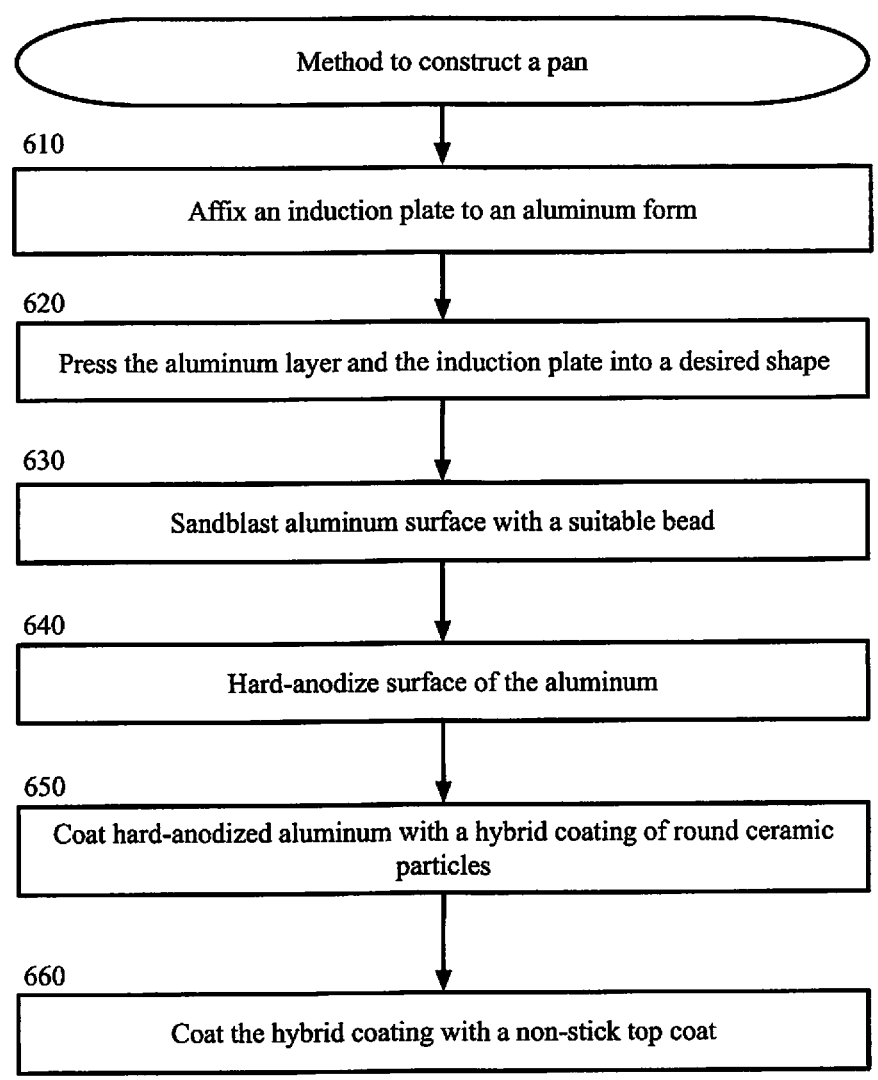
FIG. 6 is a block diagram depicting a method to form a pan.

FIG. 6 is a block diagram depicting a method 600 form a pan 100. A manufacturer, user, or other person or company may perform the steps of the method 600 to build or create a pan 100.

In block 610, a user affixes an induction plate 301 to an aluminum form, such as the aluminum layer 401. The induction plate 301 and the aluminum layer 401 may be as described herein and may be affixed as described herein.

In block 620, the user presses the aluminum layer 401 and the induction plate 301 into a desired shape. For example, the aluminum layer 401 and the induction plate 301 may be formed into a frying pan, a sauce pan, a pot, a griddle, or any other suitable shape of pan 100. The pan 100 may be formed using any suitable forming process, such as stamping.

In block 630, the user sandblasts the aluminum layer 401 with a suitably-sized bead. The sandblasting may be performed as described herein and creates a roughened surface as described herein.

In block 640, the user applies a hard-anodized surface to the sandblasted layer 402, as described herein.

In block 650, the user coats the hard-anodized aluminum layer 403 with at least one hybrid coating layer 404 of round inorganic particles in a fluororesin, as described herein. In examples, a second hybrid coating layer 405 is applied as described herein.

In block 660, the user coats the hybrid coating layers 404, 405 a with topcoat layer 406, as described herein. After the topcoat layer 406 is completed, the user may use the pan 100 to cook food or for any other suitable purposes. In alternate examples, one or more of the blocks of FIG. 6 may be omitted. For example, in certain examples, only a single hybrid coating layer 404 is used. In another example, the induction plate 301 is only added to a portion of the pan 100, such as only in the bottom of the pan 100.

FIG. 7 is a perspective view of one embodiment of a pan 100. The pan 100 is a hard-anodized pan that has a steel induction plate and a hybrid coating composition of round ceramic particles. In the example illustration of FIG. 7, the pan 100 is a round and shallow in the style commonly referred to as a "frying pan." The details of the construction of the pan 100 are discussed in greater detail with respect to FIGS. 4-6.

The pan 100 is illustrated with an elongated handle 701. The handle is affixed to the pan 101 by a rivet 702 or other connection mechanism, such as a screw, a bolt, a weld, or any other suitable connection. In certain examples, the handle 701 is constructed of a material that transfers heat at a lower rate such that the handle remains cooler than the attached pan 100. The handle 701 may be constructed with a hollow center to slow the heat transfer from the pan 100. The connection mechanism may be configured to slow the heat transfer from the pan 100, such as by using smaller rivets 702. The amount of surface area of the handle 701 touching the pan 100 may be minimized to slow the heat transfer from the pan 100. Any or all of these construction designs may be employed to allow the handle 701 to remain cooler than the pan 100. The cooler handle a user to lift the pan 100 even when the pan 100 is hot. The cooler handle 101 also allows a user to touch the handle 701 with a lower risk of being burned. In an alternate example, the pan 101 is rectangular, oblong, or any other suitable shape.

Figure 8:
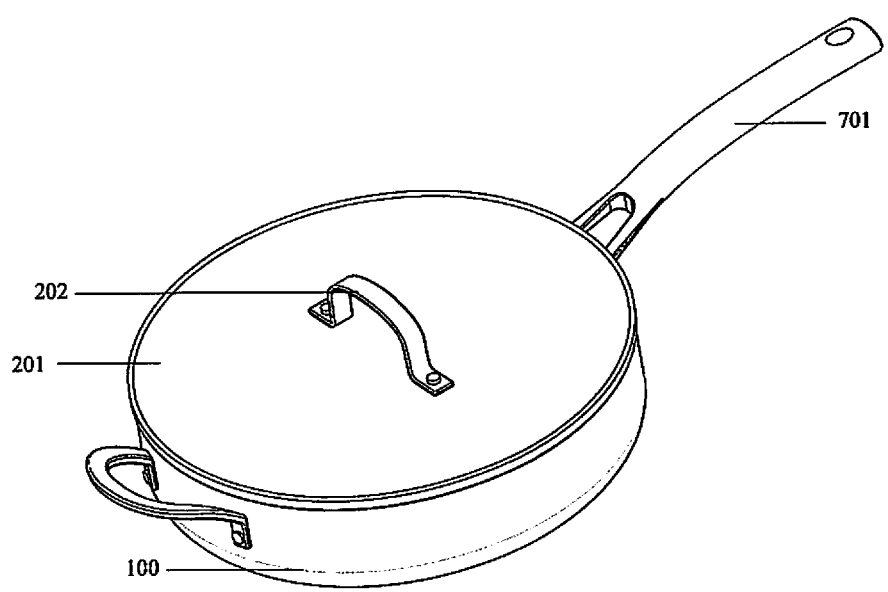
FIG. 8 is a perspective view of one embodiment of a pan and a flat lid

FIG. 8 is a perspective view of one embodiment of a pan 100 and a flat lid 201. The flat lid 201 may be of a similar size and shape as the flat lid 201 of FIG. 2. Alternatively, the lid 201 may be of a different diameter or be of a different shape to match the shape of the pan 100. For example, if the pan 101 is rectangular, then the flat lid 201 may be rectangular. The flat lid 201 may be constructed of any suitable material, such as glass, ceramic, metal, plastic, or any other suitable material. The flat lid may be constructed with a substantially flat surface instead of a convex or concave structure to allow for more efficient cleaning or stacking.

The flat lid 201 is illustrated with a handle 202. In certain examples, the handle 202 is constructed of a material that transfers heat at a lower rate such that the handle remains cooler than the attached flat lid 201. The handle 202 may be constructed with a hollow center to slow the heat transfer from the flat lid 201. The connection mechanism may be configured to slow the heat transfer from the flat lid 201, such as by using smaller rivets 102. The amount of surface area of the handle 201 touching the flat lid 201 may be minimized to slow the heat transfer from the flat lid 201. Any or all of these constructions designs may be employed to allow the handle 202 to remain cooler than the flat lid 201. The cooler handle 202 allows a user to lift the flat lid 201 even when the flat lid 201 is hot. The cooler handle 202 also allows a user to touch the handle 202 with a lower risk of being burned.

The flat lid 201 may have a seal, rim, or other hard or soft edge that seats into or over the edge of the body of the pan 100. The flat lid 201 this seals the interior of the pan 100 from the outside environment to retain heat, vapors, odors, or any other material that is being expelled by the pan 100.

Figure 9:
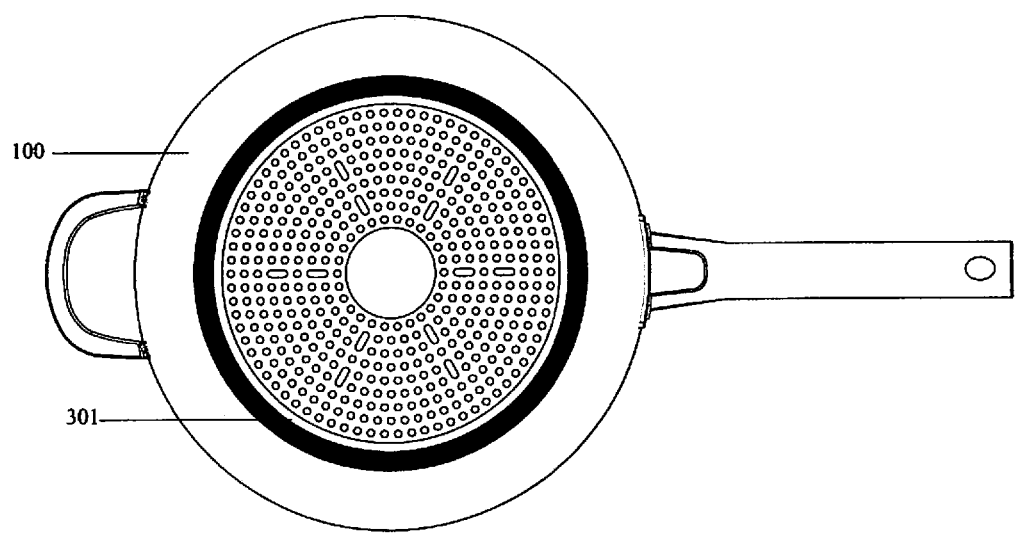
FIG. 9 is a top view of a pan with a steel induction plate.

FIG. 9 is a top view of a pan with a steel induction plate 301. The induction plate 301 may be constructed of stainless steel or any other suitable ferrous material. Induction cooktops require a cooking vessel with a ferrous metal construction to concentrate the produced oscillating magnetic field and produce heat in the metal of the pan 100. The stainless steel induction plate 301 interacts with the induction cooktop to product heat and distribute the heat across the aluminum components of the pan 100.

Figure 10:
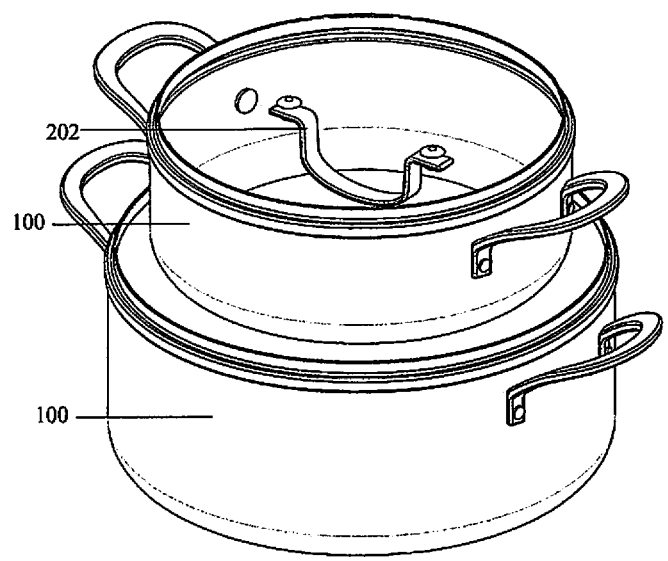
FIG. 10 is perspective view of two pans stacked.

FIG. 10 is perspective view of two pans stacked. Two pans 100 are illustrated, of different sizes. Each pan 100 has a flat lid 201. The flat lids 201 of the pans 100 are illustrated as fitted to the pan 101 in an inverted configuration with the handle 202 under the flat lid 201. When the flat lids 201 are in this configuration, a pan 100 may be placed securely on the top side of the inverted flat lid 201 to stack the pans 100.

When the two pans 100 are placed in this configuration, less room is used to store the two pans 100 than conventional storage configurations. If the lid is not inverted, the upper pan 100 would not sit flat on the flat lid 201 because the handle 202 would intrude on the space occupied by the upper pan 100. If the lids were not flat, then the upper pan 100 would wobble or otherwise sit insecurely.

Figure 11:
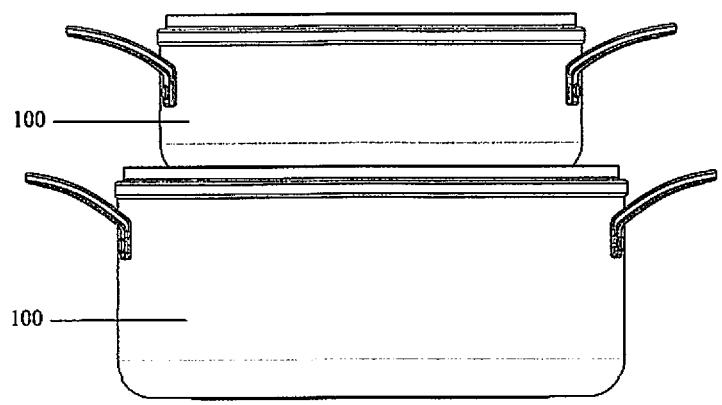
FIG. 11 is side view of two pans stacked.

FIG. 11 is side view of two pans stacked, as described in FIG. 10.

What is claimed is:

1. A cooking pan apparatus, wherein at least a portion of the cooking pan apparatus comprises:
    an aluminum base layer, wherein the aluminum base layer is roughened to create a roughened surface and then the roughened surface is hard-anodized to create a hard anodized surface layer;
    an induction plate affixed with the aluminum layer; and
    a hybrid coating layer bonded with the hard anodized surface layer opposite the induction plate and comprising spherical inorganic particles, wherein the spherical inorganic particles have a Mohs hardness of 10 and an average circularity of 0.90 to 1.00.

2. The apparatus of claim 1, wherein the induction plate is constructed of stainless steel.

3. The apparatus of claim 1, wherein the hybrid coating layer comprises a flouroresin.

4. The apparatus of claim 3, wherein the fluororesin is comprised at least in part of polytetrafluoroethylene.

5. The apparatus of claim 1, wherein the spherical inorganic particles are alumina particles or silicon carbide particles.

6. The apparatus of claim 1, further comprising a non-stick layer on the hybrid coating layer.

7. The apparatus of claim 1, further comprising a handle.

8. The apparatus of claim 7, wherein the handle is constructed of a material that has a lower heat transfer coefficient than aluminum.

9. The apparatus of claim 7, wherein the handle is constructed with a hollow center.

10. The apparatus of claim 1, further comprising a flat lid.

11. The apparatus of claim 1, wherein the apparatus is shaped to create a bottom portion as the portion of the cooking pan apparatus of one of a frying pan, a sauce pan, or a pot.

12. The apparatus of claim 11, wherein the apparatus is shaped by a stamping process.

13. The apparatus of claim 1, wherein the roughened surface comprises a sandblasted surface.

14. A method to construct a cooking pan apparatus, comprising:
    affixing an aluminum base layer to an induction plate;
    forming the aluminum base layer and the induction plate into a desired shape;
    roughening a surface of the aluminum base layer to create a roughened aluminum surface;
    anodizing the roughened aluminum surface of the aluminum base layer to create a hard anodized surface layer; and
    applying a hybrid coating layer onto the hard anodized surface layer opposite the induction plate, the hybrid coating layer comprising spherical inorganic particles, wherein the spherical inorganic particles have a Mohs hardness of 10 and an average circularity of 0.90 to 1.00.

15. The method of claim 14, further comprising applying a non-stick layer on the hybrid coating layer.

16. The method of claim 14, further comprising attaching a handle to the cooking pan apparatus, the handle being constructed of a material that has a lower heat transfer coefficient than aluminum and constructed with a hollow center.

17. The method of claim 14, wherein the roughening step comprises sandblasting a surface of the aluminum base layer.

* * * * *